United States Patent
Sato

(10) Patent No.: US 10,554,836 B2
(45) Date of Patent: Feb. 4, 2020

(54) IMAGE FORMING APPARATUS

(71) Applicant: Yuki Sato, Tokyo (JP)

(72) Inventor: Yuki Sato, Tokyo (JP)

(73) Assignee: RICOH COMPANY, LTD., Tokyo (JP)

(*) Notice: Subject to any disclaimer, the term of this patent is extended or adjusted under 35 U.S.C. 154(b) by 0 days.

(21) Appl. No.: 16/273,272

(22) Filed: Feb. 12, 2019

(65) Prior Publication Data

US 2019/0273833 A1    Sep. 5, 2019

(30) Foreign Application Priority Data

Mar. 5, 2018  (JP) .................. 2018-038669

(51) Int. Cl.
*H04N 1/00*       (2006.01)
*G03G 21/16*      (2006.01)

(52) U.S. Cl.
CPC ..... *H04N 1/00631* (2013.01); *G03G 21/1633* (2013.01); *H04N 1/00018* (2013.01); *H04N 1/00037* (2013.01)

(58) Field of Classification Search
CPC ........... H04N 1/00631; H04N 1/00018; H04N 1/00037
USPC ....................................................... 358/498
See application file for complete search history.

(56) References Cited

U.S. PATENT DOCUMENTS

| | | | | |
|---|---|---|---|---|
| 6,647,243 B2* | 11/2003 | Sato | .............. | G03G 15/6538 399/110 |
| 6,671,491 B1* | 12/2003 | Yamanaka | .............. | B42C 1/12 399/407 |
| 6,898,395 B2* | 5/2005 | Mui | .............. | G03G 15/6541 399/107 |
| 7,657,205 B2* | 2/2010 | Kang | .............. | B65H 31/22 399/110 |
| 7,894,746 B2* | 2/2011 | Waugerman | .............. | G03G 15/6552 399/110 |
| 8,794,616 B2* | 8/2014 | Matsuki | .............. | G03G 15/6544 270/58.07 |
| 9,262,111 B2* | 2/2016 | Fujinaga | .............. | G06F 3/1263 |
| 2006/0028696 A1* | 2/2006 | Michiie | .............. | G03G 15/607 358/474 |
| 2009/0062096 A1* | 3/2009 | Sasahara | .............. | B31F 1/08 493/396 |
| 2010/0019446 A1* | 1/2010 | Matsumoto | .............. | B65H 31/10 271/302 |

(Continued)

FOREIGN PATENT DOCUMENTS

JP    2014-106294    6/2014

*Primary Examiner* — Anh-Vinh T Nguyen

(74) *Attorney, Agent, or Firm* — Harness, Dickey & Pierce, P.L.C.

(57) ABSTRACT

An image forming apparatus includes an apparatus body, a post-processing device, a sheet detector, and an indicator. The apparatus body has an internal space open to an outside of the apparatus body. The post-processing device is disposed in the internal space, and has an upper surface forming a sheet ejection tray. The post-processing device is disposed in an internal sheet ejection space as an open space in the apparatus body, and includes an upper surface as a sheet ejection tray. The sheet detector detects a sheet on the sheet ejection tray. The indicator disposed in the post-processing device indicates a sheet on the sheet ejection tray.

20 Claims, 3 Drawing Sheets

(56) References Cited

U.S. PATENT DOCUMENTS

| | | | | |
|---|---|---|---|---|
| 2011/0064427 | A1* | 3/2011 | Yoshida | B65H 43/04 |
| | | | | 399/21 |
| 2012/0287455 | A1* | 11/2012 | Sawano | H04N 1/00015 |
| | | | | 358/1.13 |
| 2014/0176999 | A1* | 6/2014 | Umezawa | G06F 3/1296 |
| | | | | 358/1.15 |
| 2014/0313530 | A1* | 10/2014 | Noguchi | G06K 15/002 |
| | | | | 358/1.12 |
| 2016/0065753 | A1* | 3/2016 | Tachibana | G06F 3/121 |
| | | | | 358/1.14 |
| 2017/0305707 | A1* | 10/2017 | Iguchi | B65H 37/04 |
| 2018/0262631 | A1* | 9/2018 | Nakata | H04N 1/00132 |

* cited by examiner

IMAGE FORMING APPARATUS

CROSS-REFERENCE TO RELATED APPLICATION

This patent application is based on and claims priority pursuant to 35 U.S.C. § 119 to Japanese Patent Application No. 2018-038669, filed on Mar. 5, 2018, in the Japan Patent Office, the entire disclosure of which is hereby incorporated by reference herein.

BACKGROUND

Technical Field

Exemplary aspects of the present disclosure relate to an image forming apparatus including a post-processing device in an internal sheet ejection space.

Related Art

Among image forming apparatuses such as printers, copiers, and facsimile machines, an internal sheet ejection-type apparatus in which a printed sheet is ejected into an open space within the apparatus body has become common because of its compact size and high speed. Moreover, an internal post-processing device for performing processes such as punching and stapling that is disposed in an internal sheet ejection space has also become common.

However, since the internal sheet ejection space is limited, an option including the post-processing device in such an internal sheet ejection space hinders access to a sheet ejected to the space. Accordingly, an internal post-processing device the upper surface of which serves as a sheet ejection tray has been proposed to increase the number of sheets stacked in the internal sheet ejection space without post-processing.

SUMMARY

In at least one embodiment of this disclosure, there is provided an image forming apparatus that includes an apparatus body, a post-processing device, a sheet detector, and an indicator. The apparatus body has an internal space open to an outside of the apparatus body. The post-processing device is disposed in the internal space, and has an upper surface forming a sheet ejection tray. The sheet detector detects a sheet on the sheet ejection tray. The indicator disposed in the post-processing device indicates a sheet on the sheet ejection tray.

BRIEF DESCRIPTION OF THE DRAWINGS

The aforementioned and other aspects, features, and advantages of the present disclosure are better understood by reference to the following detailed description when considered in connection with the accompanying drawings, wherein.

Figure 1:
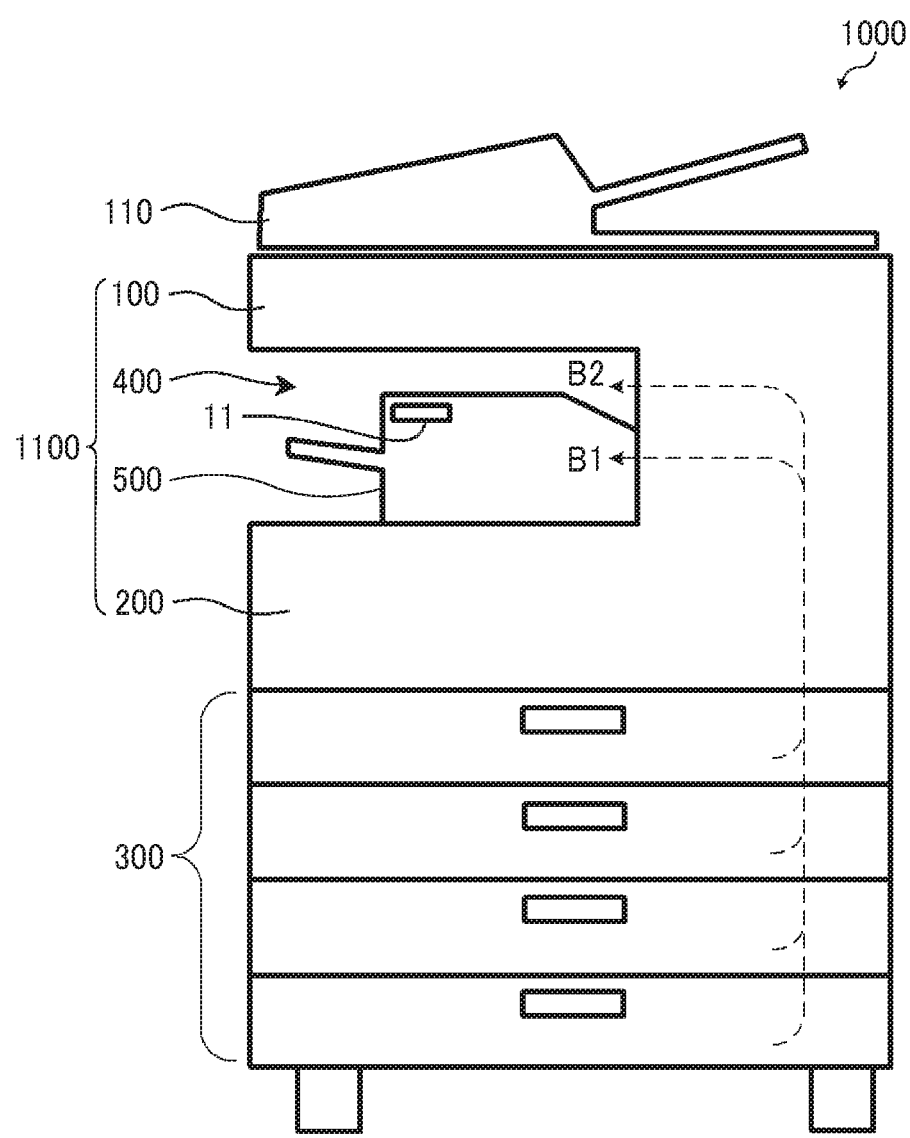
FIG. 1 is a schematic front view of a copier according to an embodiment.

The accompanying drawings are intended to depict embodiments of the present disclosure and should not be interpreted to limit the scope thereof. The accompanying drawings are not to be considered as drawn to scale unless explicitly noted.

DETAILED DESCRIPTION

In describing embodiments illustrated in the drawings, specific terminology is employed for the sake of clarity. However, the disclosure of this patent specification is not intended to be limited to the specific terminology so selected and it is to be understood that each specific element includes all technical equivalents that have the same function, operate in a similar manner and achieve similar results.

Referring now to the drawings, embodiments of the present disclosure are described below. In the drawings for explaining the following embodiments, the same reference codes are allocated to elements (members or components) having the same function or shape and redundant descriptions thereof are omitted below.

FIG. 1 is a front view schematically illustrating a configuration of a copier 1000 as one example of an image forming apparatus according to an embodiment of the present disclosure. The copier 1000 includes an image scanning unit 100, an image forming unit 200, and a sheet feeding unit 300. On the image scanning unit 100, an automatic document feeder (ADF) 110 that conveys a document to a scanning position is disposed.

In the present embodiment, an internal sheet ejection space 400 is formed in a space open to the outside and between the image scanning unit 100 and the image forming unit 200. Moreover, the copier 1000 includes a post-processing device 500 in the internal sheet ejection space 400. The image forming unit 200 forms an image using a known electrophotographic method. A detailed description of the image forming unit 200 is omitted. In the present embodiment, a sheet ejection space is provided in the internal sheet ejection space 400. Accordingly, an image such as a document image scanned by the image scanning unit 100, an image transferred from an external device such as a personal computer (PC), and an image received by a facsimile function via a telephone line is formed on a recording medium (hereinafter referred to as a sheet) such as a transfer sheet conveyed from the sheet feeding unit 300 to the image forming unit 200, and the sheet with the image formed thereon is ejected to the internal sheet ejection space 400.

Figure 2:
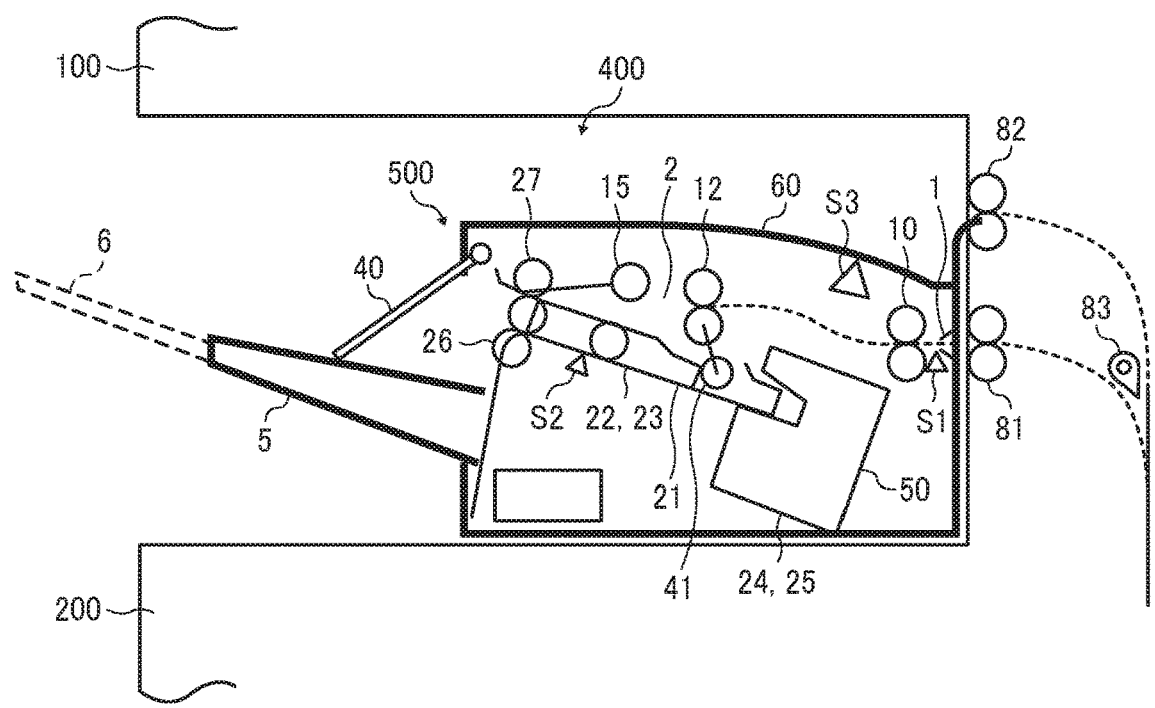
FIG. 2 is a sectional view of a post-processing device disposed in an internal sheet ejection space.
Figure 3:
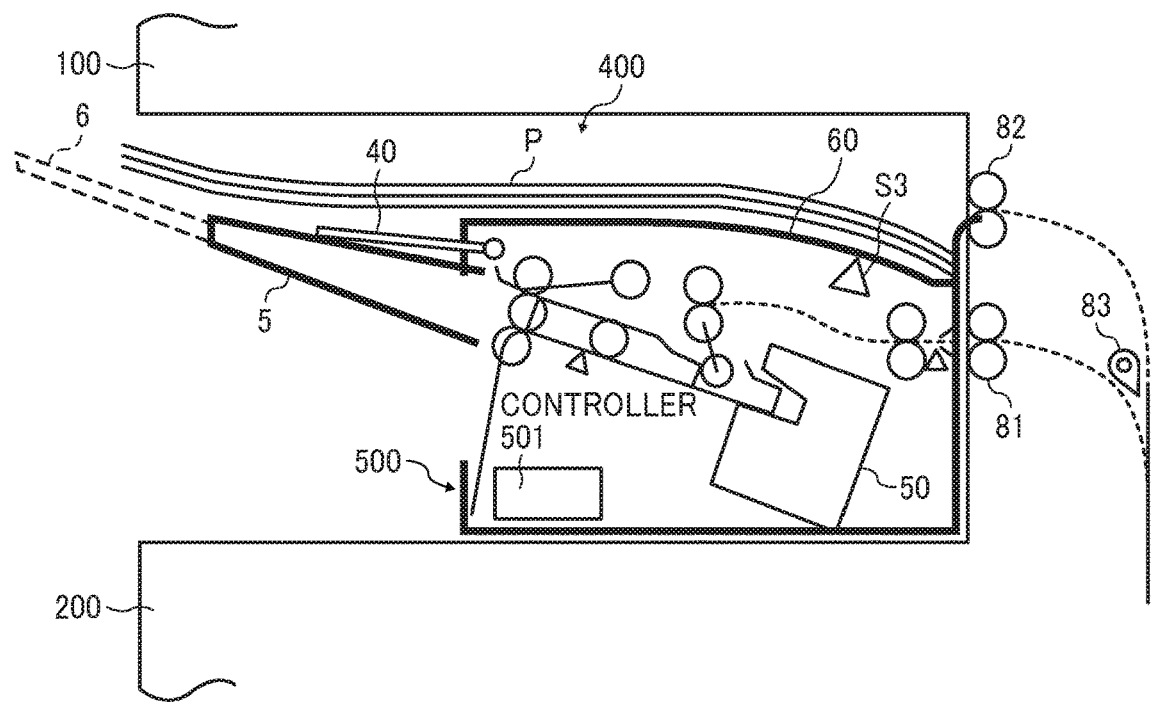
FIG. 3 is a sectional view of the post-processing device disposed in the internal sheet ejection space.

FIGS. 2 and 3 are sectional views each illustrating the post-processing device 500 disposed in the internal sheet ejection space 400. In FIG. 2, a lower ejection roller 81 and an upper ejection roller 82 are disposed on the right side of the internal sheet ejection space 400. Moreover, a switching tab 83 is disposed at an intermediate position of a sheet conveyance path. The switching tab 83 switches a conveyance direction of a sheet that is conveyed from the image forming unit 200 after an image is formed to the lower ejection roller 81 or the upper ejection roller 82. The sheet conveyed by the lower ejection roller 81 is conveyed in a direction B1 illustrated in FIG. 1 and fed to the post-processing device 500. By contrast, the sheet conveyed by the upper ejection roller 82 is conveyed in a direction B2 illustrated in FIG. 1.

The post-processing device 500 performs a post-processing such as binding, in which a plurality of sheets ejected from the lower ejection roller 81 is bundled and bound. The post-processing device 500 includes an introduction path 1 and a conveyance path 2. The introduction path 1 receives a sheet ejected from the lower ejection roller 81, the sheet having an image formed thereon. The conveyance path 2 is a path along which the sheet is intermediately stacked. In the introduction path 1, an inlet roller 10 and an inlet sensor S1 are disposed. The inlet sensor S1 detects that a sheet has been conveyed inside the post-processing device 500. An ejection roller 12 is disposed downstream of the inlet roller 10, and the sheet is conveyed to the conveyance path 2 via the ejection roller 12. In the conveyance path 2, a release roller 26 and a sheet ejection sensor S2 are disposed. A sheet ejection tray 5 including an extension tray 6 is disposed outside the release roller 26.

A sheet flap 40 is disposed above a sheet ejection port to the sheet ejection tray 5. The sheet flap 40 is supported by a housing of the post-processing device 500 so as to be rotatable near the center of the sheet to be stacked on the sheet ejection tray 5, and the sheet flap 40 is disposed such that a tip thereof contacts an upper surface of the stacked sheet. An increase in the number of sheets stacked on the sheet ejection tray 5 raises the upper surface of the stack of sheets. When an upper surface detection sensor is turned on, the sheet ejection tray 5 is lowered by a vertical moving unit.

A beating roller 15 capable of contacting and separating from a staple tray 21 is disposed in the conveyance path 2. Moreover, the post-processing device 500 includes a return roller 41, reference fences 24 and 25, jogger fences 22 and 23, and a stapler 50. The stapler 50 moves in a sheet width direction to place a staple in an appropriate position in a lower edge portion of a sheet bundle. The stapled sheet bundle is held between the release roller 26 and a driven roller 27 and then ejected onto the sheet ejection tray 5.

On the other hand, a sheet that does not need post-processing by the post-processing device 500 is ejected from the upper ejection roller 82. The post-processing device 500 includes an upper cover 60 as a part of the housing. The upper cover 60 forms an upper surface of the post-processing device 500. If a sheet ejected from the upper ejection roller 82 is relative small, the sheet is stored on the upper cover 60. That is, the upper cover 60 functions as a sheet ejection tray. A sheet detection sensor S3 for detecting a sheet ejected onto the upper cover 60 is disposed thereat. One example of the sheet detection sensor S3 is a photo interrupter, although the sheet detection sensor S3 is not limited to a photo interrupter and any other suitable element can be employed as the sheet detection sensor S3.

If a sheet to be ejected from the upper ejection roller 82 is relatively large, as illustrated in FIG. 3, the sheet ejection tray 5 is moved upward by the vertical moving unit to a height substantially the same as a height of the upper cover 60. Accordingly, a sheet P ejected from the upper ejection roller 82 is stored on the upper cover 60 and the sheet ejection tray 5.

According to the configuration of the present embodiment, a thickness of the storage tray and an installation space between the storage tray and the post-processing device 500 enable a space in the internal sheet ejection space 400 to be used less and a space in which sheets ejected from the upper ejection roller 82 can be stacked to be increased more than a case in which a storage tray is separately disposed. Thus, a larger number of sheets to be ejected from the upper ejection roller 82 without post-processing can be stacked.

The sheet ejection tray 5 and the upper cover 60 of the post-processing device 500 are used as storage units for the sheets ejected from the upper ejection roller 82, so that the number of stackable sheets can be increased without additional cost. Moreover, if a relatively large sheet P is to be stored, the existing vertical moving unit of the post-processing device 500 is used as a moving unit for moving the sheet ejection tray 5 to a height substantially the same as a height of the extension tray 6. Hence, the number of stackable sheets can be increased without additional cost.

In the configuration in which the post-processing device 500 is disposed in the internal sheet ejection space 400 as illustrated in FIGS. 2 and 3, the post-processing device 500 occupies a large space within the internal sheet ejection space 400. Moreover, the upper cover 60 also functioning as the sheet ejection ray is positioned near an upper end portion of the internal sheet ejection space 400 and immediately below the image scanning unit 100. As a result, it may be difficult to see a sheet ejected onto the upper cover 60.

Accordingly, in the present embodiment, an indicator 11 illustrated in FIG. 1 is disposed in a position that is on a front surface of the post-processing device 500 and visible from the front of an apparatus body 1100 of the copier 1000. An example of the indicator 11 includes a light emitting diode (LED) lamp. However, the indicator 11 is not limited to an LED lamp and any suitable element can be employed as the indicator 11.

The LED lamp as the indicator 11 is connected to a controller 501 (illustrated in FIG. 3) as control circuitry disposed in the post-processing device 500. Moreover, the sheet detection sensor S3 for detecting a sheet ejected onto the upper cover 60 is connected to the controller 501. When the sheet detection sensor S3 detects the presence of a sheet on the upper cover 60 as a sheet ejection tray on the upper surface of the post-processing device 500, the controller 501 controls the LED lamp as the indicator 11 such that the LED lamp is turned on. Accordingly, when a sheet is ejected onto the upper cover 60, the LED lamp is turned on and a user can readily recognize that the sheet has been discharged. That is, a sheet ejected onto the upper surface of the post-processing device 500 disposed in the internal sheet ejection space 400 can be recognized more easily, and access to the sheet can be enhanced. Hence, good operability can be provided.

Figure 4:
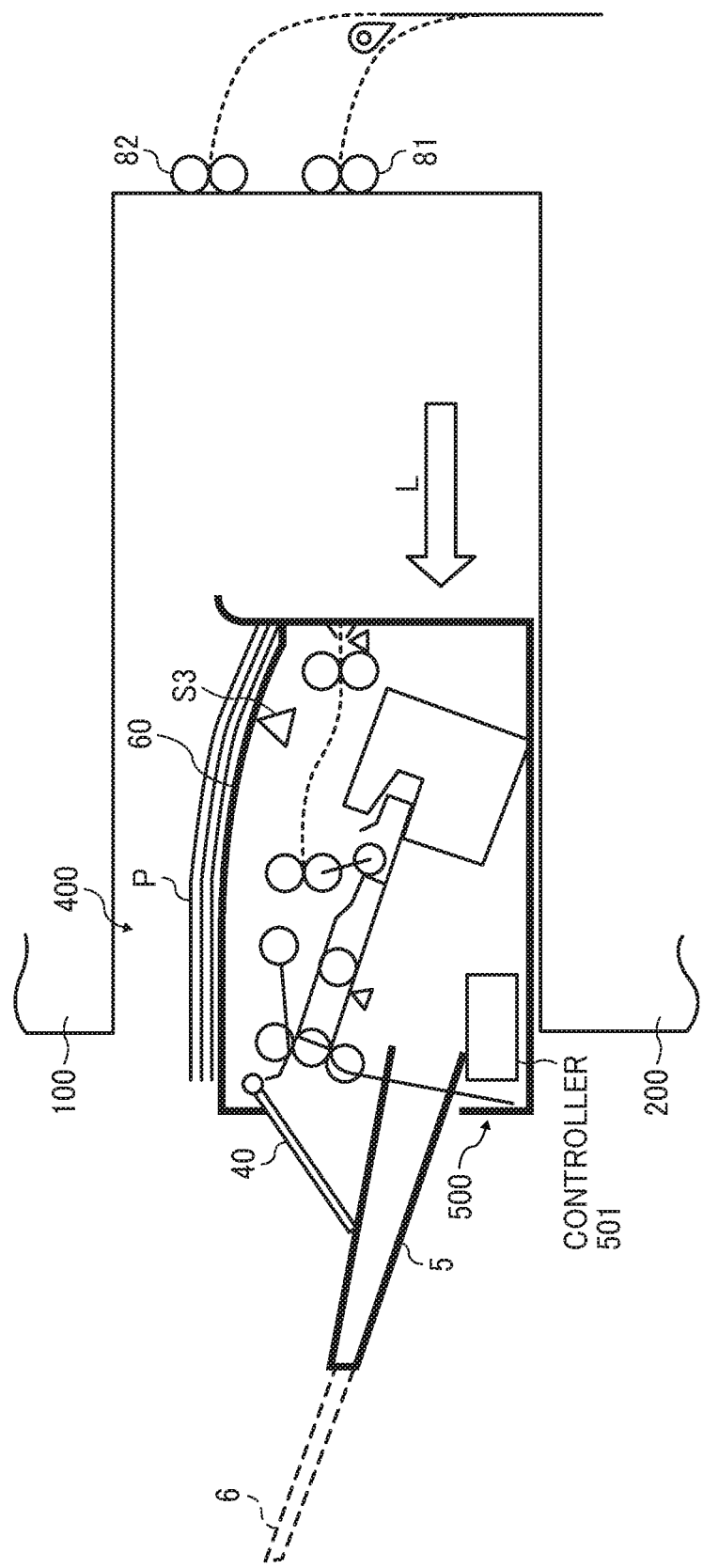
FIG. 4 is a sectional view of a state in which the post-processing device is moved out of the way during maintenance.

In the present embodiment, the post-processing device 500 and the upper cover 60 as the sheet ejection tray are formed as a single unit, and are integrally detachable from the apparatus body 1100 of the copier 1000. Moreover, the post-processing device 500 can be moved in a direction indicated by an arrow L illustrated in FIG. 4 during maintenance of a component such as the post-processing device 500.

In the present embodiment, the sheet detection sensor S3 is disposed in the post-processing device 500, so that a sheet on the upper cover 60 can be detected even in a state in which the post-processing device 500 is moved. Thus, even when maintenance is performed, a sheet can be detected and the presence or absence of a sheet can be correctly indicated (using the LED lamp as the indicator 11).

In the present embodiment, if a malfunction occurs in the post-processing device 500, the use of the LED lamp as the indicator 11 can indicate the malfunction. For example, if a sheet jam occurs inside the post-processing device 500, the LED lamp as the indicator 11 blinks on and off to indicate the malfunction.

In particular, the inlet sensor S1 is connected to the controller 501. If a sheet is fed to the post-processing device 500 from the lower ejection roller 81 (in a mode in which a sheet undergoes a post-processing), the inlet sensor S1 detects the presence or absence of the sheet. The presence of the sheet may not be changed to the absence of the sheet even if a predetermined time has elapsed. In such a case, the controller 501 determines that the sheet has been jammed (stuck) in the post-processing device 500, and controls the LED lamp as the indicator 11 to blink on and off.

In the present embodiment, a malfunction can be indicated by the indicator 11 (the LED lamp) for indicating that there is a sheet on a sheet ejection tray (the upper cover 60) of the post-processing device 500. Thus, an additional indicator for indicating a malfunction is not necessary, thereby enhancing operability of the post-processing device 500 at low cost.

The present embodiment has been described using an example of an image forming apparatus in which an upper surface of a post-processing device serves as a sheet ejection tray, and there are a sheet detector for detecting a sheet on the sheet ejection tray and an indicator for indicating the presence or absence of a sheet on the sheet ejection tray disposed in the post-processing device. When a sheet is ejected onto the sheet ejection tray on the upper surface of the post-processing device, the indicator indicates the presence of the sheet. Thus, a user can readily recognize the presence of the sheet on the sheet ejection tray. Therefore, the sheet ejected onto the upper surface of the post-processing device disposed in an internal sheet ejection space can be recognized more easily, access to the sheet can be enhanced, and good operability can be provided.

Moreover, since the sheet detector for detecting a sheet on the sheet ejection tray is disposed in the post-processing device, the indicator can indicate the presence of a sheet even if the post-processing device is moved. Moreover, in a case in which a malfunction occurs in the post-processing device, the indicator can indicate the occurrence of the malfunction. Thus, an additional indicator for indicating a malfunction is not necessary, thereby enhancing operability of the post-processing device at low cost.

Moreover, in a case in which the presence of a sheet detected by an inlet sensor is not changed to the absence of the sheet even after a predetermined time has elapsed since the detection of the presence of the sheet, the controller determines that a malfunction in which the sheet is jammed has occurred in the post-processing device, and controls the indicator to indicate the occurrence of the malfunction. Thus, a user can be indicated that the sheet has been jammed in the post-processing device.

Moreover, an indication method to be used by the indicator differs depending on whether a sheet on the sheet ejection tray is detected or a malfunction occurs in the post-processing device. Thus, even though the single indicator is used, the presence of the sheet and the occurrence of the malfunction can be separately indicated. Moreover, since the post-processing device is detachable from the body of the image forming apparatus, maintenance of the post-processing device or the apparatus body can be facilitated.

The present disclosure has been described above with reference to the drawings, but is not limited thereto. For example, a post-processing device is not limited to a device that performs a binding process. The post-processing device may perform a sorting process. Alternatively, the post-processing device may perform multiple post-processing. The configuration and form of the post-processing device is not particularly limited. The indicator to be disposed in the post-processing device can have any suitable configuration.

The image forming apparatus can have any suitable configuration as long as the embodiment of the present disclosure is applicable. The image forming apparatus is not limited to a copier. The image forming apparatus can be a printer, a facsimile machine, or a multifunctional peripheral having a plurality of functions.

Each of the functions of the described embodiments may be implemented by one or more processing circuits or circuitry. Processing circuitry includes a programmed processor, as a processor includes circuitry. A processing circuit also includes devices such as an application-specific integrated circuit (ASIC), digital signal processor (DSP), field programmable gate array (FPGA), and conventional circuit components configured to perform the recited functions.

The present disclosure has been described above with reference to specific embodiments but is not limited thereto. Various modifications and enhancements are possible without departing from scope of the disclosure. It is therefore to be understood that the present disclosure may be practiced otherwise than as specifically described herein. For example, elements and/or features of different illustrative embodiments may be combined with each other and/or substituted for each other within the scope of the present disclosure.

What is claimed is:

1. An image forming apparatus comprising:
    an apparatus body including an internal space open to an outside of the apparatus body;
    a post-processing device disposed in the internal space, the post-processing device including an upper surface usable as a sheet ejection tray;
    a sheet detector configured to detect a sheet on the upper surface of the post-processing device;
    an indicator, disposed in the post-processing device, configured to indicate a sheet being on the upper surface of the post-processing device; and
    control circuitry configured to control the indicator to further indicate an occurrence of a malfunction in the post-processing device.

2. The image forming apparatus according to claim 1, wherein the sheet detector is disposed in the post-processing device.

3. The post-processing device of claim 2, wherein the post-processing device is detachable from the apparatus body of the image forming apparatus.

4. The image forming apparatus according to claim 1, further comprising an inlet sensor, disposed near an inlet of an introduction path to the post-processing device, configured to detect a sheet,
    wherein, based upon readings from the inlet sensor, the control circuitry is configured to determine an occurrence of a malfunction, of the sheet being is jammed, within the post-processing device, and is configured to control the indicator to indicate the occurrence of the malfunction.

5. The post-processing device of claim 4, wherein the control circuitry is configured to control to control the indicator to turn on upon a sheet being detected to be on the upper surface of the post-processing device and is configured to control the indicator to blink on and off to indicate an occurrence of a malfunction in the post-processing device.

6. The post-processing device of claim 5, wherein the post-processing device is detachable from the apparatus body of the image forming apparatus.

7. The post-processing device of claim 5, wherein the post-processing device is detachable from the apparatus body of the image forming apparatus.

8. The post-processing device of claim 4, wherein the indicator includes an LED lamp.

9. The post-processing device of claim 4, wherein the post-processing device is detachable from the apparatus body of the image forming apparatus.

10. The image forming apparatus according to claim 4, wherein the control circuitry is configured to control the indicator, an indication method usable by the indicator differing between the sheet detector detecting a sheet on the upper surface of the post-processing device and an occurrence of a malfunction in the post-processing device.

11. The image forming apparatus according to claim 1, wherein the control circuitry is configured to control the indicator, an indication method usable by the indicator differing between the sheet detector detecting a sheet on the upper surface of the post-processing device and an occurrence of a malfunction in the post-processing device.

12. The post-processing device of claim 11, wherein the control circuitry is configured to control to control the indicator to turn on upon a sheet being detected to be on the upper surface of the post-processing device and is configured to control the indicator to blink on and off to indicate an occurrence of a malfunction in the post-processing device.

13. The post-processing device of claim 12, wherein the post-processing device is detachable from the apparatus body of the image forming apparatus.

14. The post-processing device of claim 11, wherein the indicator includes an LED lamp.

15. The post-processing device of claim 11, wherein the post-processing device is detachable from the apparatus body of the image forming apparatus.

16. The image forming apparatus according to claim 1, wherein the post-processing device is detachable from the apparatus body.

17. The post-processing device of claim 1, wherein the control circuitry is configured to control to control the indicator to turn on upon a sheet being detected to be on the upper surface of the post-processing device and is configured to control the indicator to blink on and off to indicate an occurrence of a malfunction in the post-processing device.

18. The post-processing device of claim 17, wherein the indicator includes an LED lamp.

19. The post-processing device of claim 17, wherein the post-processing device is detachable from the apparatus body of the image forming apparatus.

20. The post-processing device of claim 1, wherein the indicator includes an LED lamp.

* * * * *